(12) United States Patent
Werner et al.

(10) Patent No.: US 11,022,195 B2
(45) Date of Patent: Jun. 1, 2021

(54) ELASTIC MOUNT

(71) Applicant: Vibracoustic AG, Darmstadt (DE)

(72) Inventors: Philipp Werner, Lueneburg (DE); Hilrich Kardoes, Winsen (DE)

(73) Assignee: Vibracoustic AG, Darmstadt (DE)

(*) Notice: Subject to any disclaimer, the term of this patent is extended or adjusted under 35 U.S.C. 154(b) by 0 days.

(21) Appl. No.: 16/839,588

(22) Filed: Apr. 3, 2020

(65) Prior Publication Data
US 2020/0325957 A1 Oct. 15, 2020

(30) Foreign Application Priority Data
Apr. 11, 2019 (DE) .......................... 102019109608.1

(51) Int. Cl.
| | |
|---|---|
| *F16F 13/14* | (2006.01) |
| *B60G 15/06* | (2006.01) |
| *B60K 5/12* | (2006.01) |
| *B62D 24/04* | (2006.01) |

(52) U.S. Cl.
CPC .......... *F16F 13/14* (2013.01); *F16F 13/1427* (2013.01); *F16F 13/1481* (2013.01); *B60G 15/06* (2013.01); *B60K 5/1208* (2013.01); *B62D 24/04* (2013.01)

(58) Field of Classification Search
CPC .... F16F 13/14; F16F 13/1427; F16F 13/1481; B60K 5/1208
See application file for complete search history.

(56) References Cited

U.S. PATENT DOCUMENTS

| | | | |
|---|---|---|---|
| 7,441,759 B2 | 10/2008 | Franke et al. | |
| 8,056,888 B2 | 11/2011 | Siemer et al. | |
| 2018/0066726 A1* | 3/2018 | Parr ........................ | F16F 13/10 |

FOREIGN PATENT DOCUMENTS

| | | |
|---|---|---|
| AT | 152237 B | 1/1938 |
| AT | 152327 B | 1/1938 |
| DE | 102004047173 A1 | 4/2006 |
| DE | 102005043234 A1 | 3/2007 |
| DE | 102007016399 B4 | 12/2009 |
| JP | H01126447 A | 5/1989 |
| JP | H0960675 A | 3/1997 |

OTHER PUBLICATIONS

International Search Report, EP19213937, dated Oct. 22, 2020.

* cited by examiner

*Primary Examiner* — Vishal R Sahni
(74) *Attorney, Agent, or Firm* — Fishman Stewart PLLC (57) ABSTRACT

An elastic mount for absorbing static and dynamic loads includes an inner part, an outer part, and at least one elastomer mount that elastically connects the parts. The elastomer mount transfers from a first position to a second position when absorbing a static load acting in the direction of a longitudinal axis of the mount, and may have a first elastomer body, second elastomer body, and an intermediate element arranged between the two elastomer bodies. The intermediate element may have a first connection surface aligned with the longitudinal axis such that in the second position the first elastomer body is soft in shear in the Z-direction, and rigid in the X-direction and/or the Y-direction; and a second connection surface aligned with the longitudinal axis such that in the second position the second elastomer body is soft in shear in the X-direction and/or in the Y-direction and rigid in the Z-direction.

13 Claims, 4 Drawing Sheets

ELASTIC MOUNT

CROSS-REFERENCE TO RELATED APPLICATIONS

This application claims the benefit of German Patent Application Serial No. 10 2019 109 608.1 filed on Apr. 11, 2019, the disclosure of which is hereby incorporated by reference in its entirety as though fully set forth herein.

TECHNICAL FIELD

The present invention concerns an elastic mount for absorbing static and dynamic loads of a vehicle part, comprising an inner part to which the vehicle part can be fixed, an outer part which can be inserted into a receiving eye, and at least one elastomer mount which elastically connects the inner part and the outer part.

BACKGROUND

An elastic mount of the type mentioned above is used to support a vehicle component on a vehicle body. On the one hand, the mount absorbs the weight of the vehicle part, i.e. its static load, and dampens and/or absorbs the vibrations generated by the vehicle part, i.e. its dynamic loads, in order to increase driving comfort. Such a mount is used, for example, as a subframe mount, power-unit mount, such as an engine or radiator mount, or even as a driver's cab mount in passenger cars or trucks. As a result of the static load, the mount deflects in the axial direction by compressing the elastomer mount. This condition is referred to as the design position or abbreviated "K0-position" of the mount.

In modern vehicles, weight is increasing due to the electrification of the powertrain, such as the use of batteries, and the simultaneous requirement for low stiffness for high driving comfort in the K0-position leads to large mount deflections in the load direction. Known wedge mounts, whose elastomer mounts have wedge-shaped and symmetrically constructed elastomer pads, are able to absorb such loads, but they are highly progressive due to the increasing compressive stresses in the elastomer pads. On the one hand, such progressive behaviour is often undesirable, on the other hand, progressive behaviour requires that the unloaded initial stiffness is even lower in order to achieve the correct stiffness at the target point. Compared to mounts with constant, i.e. non-progressive stiffness, this results in even longer deflection travel and, as a consequence, even higher elongations until the K0 position is reached.

If, on the other hand, elastomer shear pads are aligned in the axial direction, they are less progressive in the axial direction. However, they are relatively stiff when loaded radially, since in this case compressive stresses are created in the elastomer pad. For reasons of comfort, however, low radial stiffness is often required in addition to the linear axial stiffness mentioned above.

In order to avoid these disadvantages, DE 10 2007 016 399 B4 discloses a biaxially damping hydromount whose axial and radial damping properties can be determined largely independently of each other. For this purpose, the hydromount has a supporting body which consists of an inner core, an outer wall of an upper part of a housing spaced radially from the inner core, and an elastomer spring connected to the inner core and the outer wall by vulcanization, the spring being divided into two sections by an intermediate element. The intermediate element is shaped in such a way that, in the event of axial deflection of the core in the radial direction, compressive stresses occur in the elastomer spring both between the intermediate element and the inner core and between the intermediate element and the outer wall. As a result, the radial characteristic under loads is high. In addition, the mount is still slightly progressive in the axial direction, since the inner elastomer track close to the core exhibits high pressure components and, due to the tilt—here: >15°—the outer elastomer track exhibits low pressure components. Due to this progression, the basic axial characteristic is softer in the unloaded point than when axially deflected due to the preload. For a given axial stiffness in the K0 position, the progressive mount therefore deflects more than a linear mount, which leads to higher elongations and thus to a potentially lower life.

A possible alternative embodiment for a mount with linear axial stiffness is an elastomer pad without an intermediate element which is as long in the axial direction and has no or only a slight overlap in the radial direction in the K0 position between a lower core side connection point and an upper exterior connection point. Such an elastomer pad is long in the axial direction and requires a lot of axial installation space. At the same time, however, a long axial shear pad is also very soft to expansion. The long axial shear pad, if it serves as a diaphragm in a hydraulically damping mount, cannot withstand internal pressure sufficiently, but bulges slightly outwards. This not only results in an axial stiffness that strongly depends on the dynamic load. It is also very difficult to integrate sufficient pumping capacity for high damping rate in such a mount.

However, if the mount is designed relatively short in the axial direction, there is an overlap between the lower core-side connection point and the upper exterior connection point at full deflection in the K0 position, which results in high radial stiffness due to pressure components at radial deflection. As a positive characteristic, such a short axial shear pad has a high expansion stiffness. A short axial shear pad therefore does not tend to bulge and can thus implement a high pumping capacity or damping rate in a hydraulically damped mount.

The invention is based on the task of creating an elastic mount which, after axial deflection, has a low radial characteristic and, at the same time, a linear axial characteristic and, in addition, a high expansion stiffness.

This task is solved with the features of claim 1.

Advantageous embodiments of the elastic mount are subject of the dependent claims.

Below, the direction in which a motor vehicle moves is referred to as the X-direction. A direction transverse to the direction of travel is referred to as the Y-direction, and the direction at the level of the vehicle, representing the longitudinal axis or the axial direction of the mount, is referred to as the Z-direction. The radial direction is referred to as the X-direction and Y-direction.

Below, "soft in shear" refers to the property of a body that can be easily sheared and therefore has a low shear stiffness.

According to one aspect, an elastic mount for absorbing static and dynamic loads of a vehicle part is proposed, comprising an inner part on which the vehicle part can be fixed, an outer part which can be inserted into a receiving eye or fixed to a vehicle structure, and at least one elastomer mount which elastically connects the inner part and the outer part to one another, wherein the elastomer mount can be transferred from a first position to a second position when absorbing a static load acting in the direction of the longitudinal axis of the mount, wherein the elastomer mount has a first elastomer body, a second elastomer body and an intermediate element which is arranged between the two elastomer bodies and to which the elastomer bodies are connected in a substance-to-substance connection, the intermediate element having at least one first connection surface for the first elastomer body and at least one second connection surface for the second elastomer body, the first connection surface being aligned with the longitudinal axis of the elastomer mount in such a way that for absorbing the loads, in the second position the first elastomer body is designed to be soft in shear in the Z-direction and to be rigid in the X-direction and/or in the Y-direction, and wherein the second connection surface is aligned with the longitudinal axis of the elastomer mount in such a way that for absorbing the loads, in the second position the second elastomer body is designed to be soft in shear in the X-direction and/or in the Y-direction and to be rigid in the Z-direction.

Since the intermediate element divides the elastomer mount into two elastomer bodies, namely, an elastomer body which is soft in shear in the Z-direction, which may also be referred to as an axial mount, and an elastomer body which is soft in shear in the X-direction and/or in the Y-direction, which may also be referred to as a radial mount, the elastic mount can decouple the radial direction from the axial direction. In the K0 position, the axial mount has a shear pad aligned in the axial direction, which has a relatively small progressive characteristic curve independent of the deflection state. The radial mount is radially very soft in shear and at the same time axially very rigid. This allows the radial mount to transmit the axial loads to the axial mount without itself experiencing large axial deflections. By inserting the intermediate element, a radially soft mount arrangement can thus be combined with a linear mount assembly soft in shear in the axial direction for high preloads. In addition, the axially soft axial mount assembly may also be used as a working diaphragm in a hydraulically damping mount, in particular in an axially damping hydromount. In addition, the intermediate element increases the expansion stiffness of the elastomer pad even under high axial deflections and thus enables a high pumping capacity.

Due to the design of the intermediate element and the elastomer bodies arranged on both sides, a particularly modularly adjustable characteristic spread is possible, namely a soft characteristic in the Z-direction that is almost linear over a wide load range and can withstand particularly high loads and thus deflections in the Z-direction, in combination with low radial stiffness in the Y- and X-direction. This is achieved in particular by the alignment or the course of the connection surfaces relative to the longitudinal axis of the mount. By providing the connection surfaces on the intermediate element extending to the longitudinal axis of the mount, two mounts can be connected in series, whereby the lowest series-connected stiffness dominates the overall stiffness. In this way, very high axial stiffness can be combined with an axially soft mount of linear characteristics over a high load range to form a mount with particularly long durability and linear mount behaviour, while particularly soft radial stiffness combined with high radial stiffness results in low overall radial stiffness. Advantageously, the intermediate element arranged between the radially soft radial mount and the axial mount is load transmitting. For this purpose, the intermediate part may be made of metal or plastic or a hybrid material. In the present case, hybrid material refers to a composite material which is a combination of metallic, ceramic and/or polymeric materials, the composite material preferably being formed as a layered composite of at least two of these materials.

The elastic mount may be used wherever high axial loads occur and, at the same time, where a stiffness curve that is as linear as possible as well as low radial stiffness under load are required for high driving comfort. For example, the elastic mount may be used as a rear axle support mount or body mount, a power unit mount such as an engine mount or radiator mount, or as a driver's cab mount in passenger cars or trucks.

Advantageously, the second elastomer body in the second position has a stiffness in the Z-direction that is at least three times, preferably at least five times, as high as the first elastomer body in the second position, whereas the first elastomer body in the second position has a stiffness in the X-direction and/or Y-direction which is at least three times as high as the second elastomer body in the second position.

In an advantageous embodiment, the elastomer bodies are also fixed in an adhesive manner to the intermediate element on the opposite sides of their connection surfaces. In an advantageous embodiment, the connection surfaces on the inner part and/or on the outer part are essentially parallel to the connection surfaces on the intermediate element.

In an advantageous embodiment, the inner part and/or the outer part are designed as tubes or sleeves. Further advantageously, the inner part and/or the outer part are made of metal or plastic or a hybrid material. The inner part may also be referred to as core, inner tube or inner sleeve. The outer part may also be referred to as outer tube or outer sleeve. In an advantageous embodiment, the inner part has a through-hole by means of which the elastic mount can be connected to the vehicle part via a bolt. In an advantageous embodiment, the mount is pressed into a receiving eye via the outer part. In an advantageous embodiment, the inner part has an axial section extending in the direction of a longitudinal axis of the mount and a radial section extending perpendicular to it. Advantageously, the axial section and/or the radial section serve as the connection surface of the second elastomer body to the inner part. In an advantageous embodiment, the radial section is essentially parallel to the second connection surface of the intermediate element. In an advantageous embodiment, the outer part has a sleeve section extending in the direction of the longitudinal axis of the mount and a collar section extending transverse to the longitudinal axis of the mount. Advantageously, the sleeve section and/or the collar section serves as the connection surface for the first elastomer body. In an advantageous embodiment, the sleeve section is essentially parallel to the first connection surface of the intermediate element.

In an advantageous embodiment, the first connection surface is parallel to the longitudinal axis of the mount or at an angle of at most+−15° to the longitudinal axis of the mount. As a result, the first elastomer body, which corresponds to the axial mount, is positioned in the K0 position essentially perpendicular to the longitudinal axis of the mount, so that the axial characteristic curve of the axial mount is largely linear over a broad load range, but particularly in the K0-position. Typical preloads may be up to 5 kN. Typical requirements regarding the axial stiffnesses in the K0 position are between 400 and 800 N/m, with typical deflections under K0 load being between 8 mm and 12 mm, to which travel distances due to the dynamic loads must be added. Advantageously, the axial mount has a large radial overlap in the deflected state, so that large compressive stresses occur in this mount under a load in the radial direction. This makes the axial mount very stiff in the radial direction.

In an advantageous embodiment, the second connection surface is perpendicular to the longitudinal axis of the mount or aligned at an angle of at most+−10° to an axis perpendicular to the longitudinal axis. Since the connected surface of the second elastomer body, which corresponds to the radial mount, is essentially perpendicular to the longitudinal axis of the mount, the radial mount is primarily subjected to shear under radial loads and is therefore radially soft. Since the total radial stiffness of the elastic mount is the result of the series connection of the radial mount and the axial mount, the lowest stiffness determines its total stiffness. The radial mount is therefore able to reduce the overall radial stiffness. In an advantageous embodiment, the radial mount has a low overall height in the longitudinal direction and a large expansion in the axial direction and thus a large connection surface that is essentially perpendicular to the longitudinal direction of the mount.

In an advantageous embodiment, the first connection surface and/or the second connection surface has at least one recess and/or at least one elevation. The stiffness ratios of the first elastomer body and/or the second elastomer body may be adjusted via the at least one recess and/or one elevation. In addition, the first connection surface and/or the second connection surface may have several recesses and/or elevations.

In an advantageous embodiment, the second elastomer body has a height in the direction of the longitudinal axis and a width transverse to the longitudinal axis, the ratio of height to width being at least 1 to 3. As a result, the second elastomer body, which acts as a radial mount, has a flat design so that it is very stiff in the axial direction and can transmit high loads, while in the radial direction, which is essentially loaded in shear, it consequently has a very low radial stiffness.

In an advantageous embodiment, the first elastomer body has a height in the direction of the longitudinal axis and a width transverse to the longitudinal axis, the height in the second position being greater than or equal to the width. As a result, the first elastomer body, which acts as an axial mount, can support high axial preloads with a low, essentially linear characteristic.

In an advantageous embodiment, the second elastomer body is fixed between two largely parallel mounting surfaces, perpendicular to the Z-direction of the mount, in a manner adhesive to the intermediate element and the opposite mounting surface. As the intermediate element has an expansion in the Z-direction, an annular gap is created between the intermediate element and the opposite connection surface in the region of this Z-expansion, which is usually not filled with elastomer material. Therefore, the second elastomer body has the shape of a flat ring, which results in a stiffness that is soft in shear in the X and Y-directions.

In an advantageous embodiment, the annular gap formed in the Z-direction is partially filled with an elastomer material. This may be understood as a continuation of the second elastomer body in the spatial Z-direction. If this occurs partially in the X or Y-direction in the annular gap, a characteristic spread between the X and Y-direction may be easily set.

In an advantageous embodiment, the first elastomer body and/or the second elastomer body has at least one elastomer pad which acts in the X-direction and/or Y-direction. By means of the elastomer pad, a spread of the characteristics between the X and Y-directions can be set. Preferably, the second elastomer body includes the elastomer pad. The elastomer pad may protrude into an annular gap formed between the intermediate element and the connection surface of the second elastomer body opposite the intermediate element.

In an advantageous embodiment, the intermediate element is rectangular or T-shaped in cross-section. An intermediate element with a rectangular cross-section can be manufactured at low cost.

In an advantageous embodiment, a first diaphragm and a second diaphragm are provided, wherein the elastomer mount and the first diaphragm delimit a first fluid chamber and the first diaphragm and the second diaphragm delimit a second fluid chamber, and wherein the fluid chambers are filled with a fluid and are connected to one another via a damping channel in a fluid-conducting manner. As a result, the elastic mount forms a hydraulically damping mount, which can also be referred to as a hydromount. Preferably, the hydromount is an axially damping hydromount. The intermediate element increases the expansion stiffness of the elastomer mount even under high deflection travels in axial direction and thus enables a high pumping capacity. Since the axial mount is longer in the axial direction than in the radial direction, its expansion stiffness is high. As a result, the elastomer mount has a high pumping capacity and thus damping performance, so that the elastomer mount can be used as a pump diaphragm. Here, the two elastomer bodies together with the intermediate element connect the inner and outer parts in a fluid-sealing manner so that they contribute to the sealing of the fluid chambers. Since the radial mount has a lower mean overall height but large mean radial expansion, the radial mount is also expansion-stiff. The elastomer mount is therefore expansion-stiff and very well suited to act as a pump diaphragm in an axially damping hydromount.

In an advantageous embodiment, the intermediate element is embedded in a ring between the first and second elastomer body. As a result, the blow-out stiffness and thus the potential damping and/or absorber performance of the mount is higher than if the intermediate element is not designed as a closed ring, since any bulging of the elastomer bodies acting as elastomer diaphragm is reduced.

In an advantageous embodiment, the first diaphragm has a first leg, a second leg and a base connecting the two legs, with an average thickness of one of the legs being at least twice that of the other leg. Since the average thickness of one leg is at least twice as thick as that of the other leg, the diaphragm can perform large movements in the axial and/or radial direction. In addition, the diaphragm is insensitive to expansion due to high differential pressures between the two fluid chambers. In most operating conditions, this leads to a high degree of expansion stiffness of the diaphragm, which results in a large pump volume and thus improved damping effectiveness. In addition, this design ensures that the diaphragm is very stiff at differential pressures between the fluid chambers. Mean thickness refers to the average thickness of a leg over its entire length, i.e. from the base to its free end. It is advantageous that the base is U-shaped with a uniform thickness, with the legs projecting from the U-shaped base.

The cross-section of the leg, which is on average at least twice as thick, can expand starting from the base. The leg that is at least twice as thick can expand continuously or discontinuously. The leg that is at least twice as thick on average, may increase, for example, in funnel shape starting from the base. As a result, compared to the other leg, the leg that is at least twice as thick has a high expansion-stiffness, but at the same time, in large translational deflections, it exhibits a harmonic bending line, which leads to low elongation stress and thus to a long service life of the diaphragm.

In an advantageous embodiment, the leg that is twice as thick on average bends in the direction of the core when a pressure difference occurs at which the fluid chamber designed as a working chamber has a higher pressure than the fluid chamber designed as a compensating chamber, wherein the base that connects the two legs to one another abuts against the core. In this position, the diaphragm is particularly expansion-stiff, so that a high pumping capacity and thus a high damping capacity can be achieved.

In an advantageous embodiment, the first diaphragm has an inner sleeve that can be connected to the inner part and an outer sleeve that can be connected to the outer part. A channel can be inserted into the outer sleeve. Further advantageously, the first diaphragm is bonded to the inner sleeve and the outer sleeve; in particular, the leg that is at least twice as thick an average is bonded to the outer sleeve, and the other leg is bonded to the inner sleeve. The outer sleeve may be made of a laser-transparent plastic so that it can be welded to the outer part by means of laser transmission welding.

In an advantageous embodiment, the second diaphragm is a compensating diaphragm. In an advantageous embodiment, the second diaphragm has an inner sleeve that can be connected to the inner part and an outer sleeve that can be connected to the outer part. Further advantageously, the second diaphragm is bonded to the inner and outer sleeves.

In an advantageous embodiment, a second elastomer mount is provided which acts in the X-direction and/or Y-direction. The second elastomer mount thus acts as an additional radial mount. Advantageously, the second elastomer mount has a high characteristic spread. In an advantageous embodiment, the radial stiffnesses of the elastomer mount with intermediate element and those of the additional second elastomer mount are connected in parallel. As a result, the radial stiffness of the first elastomer body acting as an axial mount no longer determines the radial stiffness of the overall design. The second elastomer mount acting as a radial mount may comprise an inner sleeve connectable to the inner part, an outer sleeve connectable to the outer part and an elastomer element. Intermediate plates may be inserted into the elastomer element of the second elastomer mount. The outer sleeve may be made of a laser-absorbing plastic so that it can be welded to the laser-transparent outer part by means of laser transmission welding.

In an advantageous embodiment, a hydraulically damping mount is integrated in the mount. The hydraulically damped mount is preferably designed as a radially damping hydromount. In an advantageous embodiment, the hydromount has an inner sleeve that can be connected to the inner part, an elastomer element and a cage that can be connected to the outer part. Instead of a cage, ring-shaped structures can also be provided, which can be connected to the outer part. The elastomer element may have two elastomer diaphragms that define fluid chambers filled with a fluid. The fluid chambers are connected to each other via a channel. The channel may be a separate part. Advantageously, the elastomer element is bonded to the inner sleeve and the two sleeve-shaped fastening elements.

In an advantageous embodiment, the hydraulically damping mount is an axially damping hydromount.

In an advantageous embodiment, the mount has a receiving cup in which the elastomer mount, the first diaphragm, the second diaphragm, the second elastomer mount and/or the hydraulically damping mount are inserted. For fixing the inserted parts, the receiving cup may have a circumferential edge section at the bottom. In addition, the receiving cup may be folded over, in particular flanged, around the outer part for fixing. In the following, the elastic mount as well as other features and advantages are explained in more detail using design examples, which are shown schematically in the figures. Shown are:

DETAILED DESCRIPTION

Figure 1:
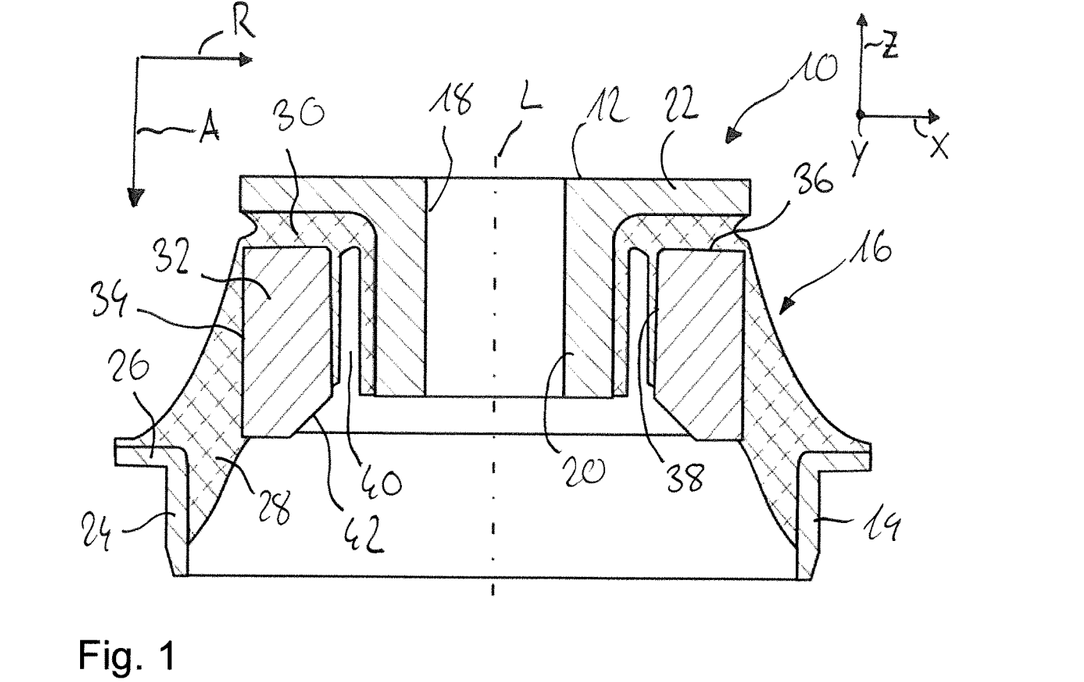
FIG. 1 a cross-section through an elastic mount according to a first embodiment in the unloaded state.
Figure 2:
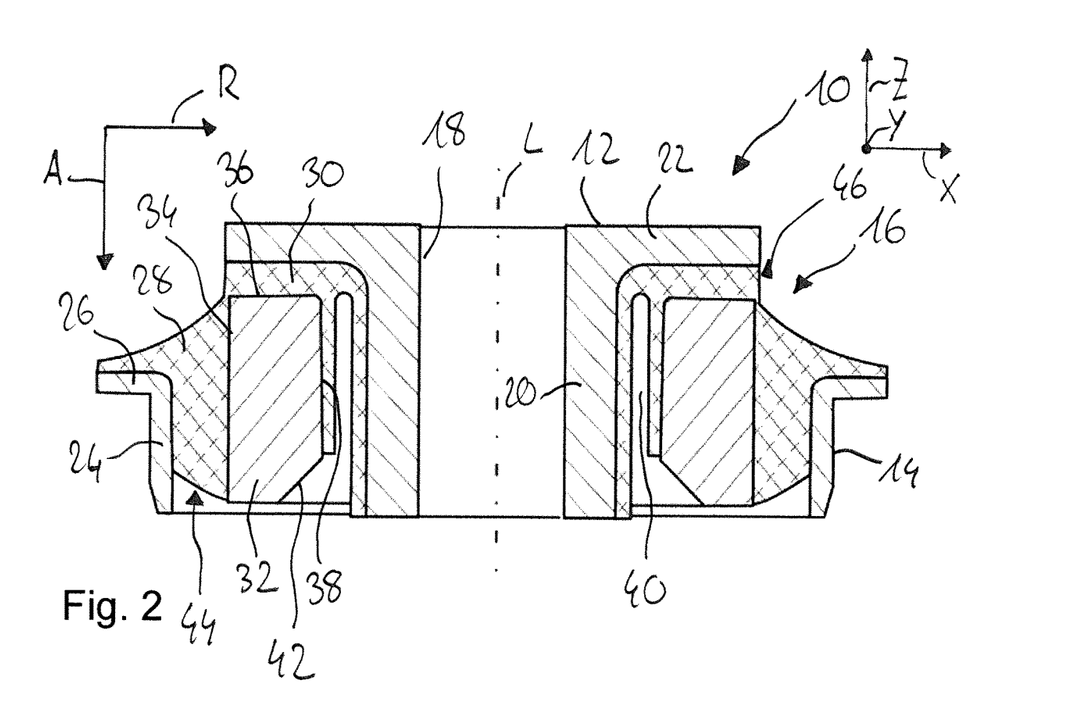
FIG. 2 the elastic mount shown in FIG. 1 under static preload.

FIGS. 1 and 2 show an elastic mount 10, which is used to support a vehicle part not shown, such as a subframe, an engine, a transmission or a driver's cab.

The mount 10 has an inner part 12, an outer part 14 surrounding the inner part 12 and an elastomer mount 16 elastically connecting the two parts.

The inner part 12 is made of metal or plastic or a hybrid material, such as a metal-plastic hybrid, and has a through hole 18 though which a bolt (not shown) can be passed to connect the mount 10 to the vehicle part. The inner part 12 is largely rotationally symmetrical and has an axial section 20 extending in the direction of a longitudinal axis L of the mount 10 or in axial direction A and a radial section 22 extending perpendicular to the longitudinal axis L or in radial direction R.

The outer part 14 is designed as a thin-walled sleeve that can be inserted into a receiving eye of the vehicle body (not shown). The outer part 14 has a sleeve section 24 extending in the direction of the longitudinal axis L and a collar section 26 extending transverse to the longitudinal axis L. The outer part 14 may be made of metal or plastic.

The elastomer mount 16 has a first elastomer body 28, a second elastomer body 30 and an intermediate element 32 arranged between the two elastomer bodies 28, 30.

The first elastomer body 28 is bonded to the outer part 14 and the intermediate element 32. In particular, the first elastomer body 28 is bonded to a first connection surface 34 of the intermediate element 32. The second elastomer body 30 is bonded to the inner part 12 and to the intermediate element 32. In particular, the second elastomer body 30 is bonded to a second connection surface 36 of the intermediate element 32 and to a third connection surface 38 of the intermediate element 32. As can also be seen in FIGS. 1 and 2, a recess 40 is introduced into the second elastomer body 30.

The intermediate element 32 is ring-shaped and may be made of metal or plastic or a metal-plastic hybrid. In the present embodiment, the intermediate element 32 is approximately rectangular in cross section with a circumferential bevel 42. As can be seen in FIGS. 1 and 2, the first connection surface 34 of the intermediate element 32 is aligned parallel to the longitudinal axis L of the mount 10, and the second connection surface 36 of the intermediate element 32 is aligned perpendicular to the longitudinal axis L of the mount 10.

FIG. 1 shows the elastic mount 10 in the unloaded condition. In the state shown in FIG. 2, a static load acts on the elastic mount 10 in longitudinal direction L, compressing the two elastomer bodies 28, 30 and transferring them to the second position shown in FIG. 2. The position shown in FIG. 2 is referred to as the design or K0 position.

In the K0 position, the first elastomer body 28 absorbs both further static and dynamic loads in the Z-direction due to the first connection surface 34 extending parallel to the longitudinal axis L. As a result, in the K0 position, the first elastomer body 28 acts as an axial mount 44 which is soft in shear, while it is relatively rigid in the radial direction R. The second elastomer body 30 is soft in shear in the K0-position due to the second connection surface 36 extending perpendicular to the longitudinal axis L in the X-direction and/or in the Y-direction, while it is very stiff in the Z-direction. As a result, the second elastomer body 30 acts as a soft radial mount 46 in the K0 position.

Since the first elastomer body 28 has a vertical positioning in the unloaded state, as shown in FIG. 1, the axial characteristic curve is relatively linear in the large load range, but in particular in the preload point. Typical preloads may be up to 5 kN. A typical requirement for the axial stiffnesses at the preload point is between 400 and 800 N/m, with typical deflections under K0 load being between 8 mm and 12 mm, to which the displacements due to the dynamic loads.

In the K0 position shown in FIG. 2, i.e. in the deflected state, the axial mount 44 has a large radial overlap, so that large compressive stresses occur in this mount under radial load. As a result, the axial mount 44 is very stiff in the radial direction.

The first elastomer body 28 has a height in the direction of the longitudinal axis L and a width transverse to the longitudinal axis L, the height being greater than or equal to the width in the second position. As a result, the first elastomer body 28 acting as axial mount 44 can support high axial preloads with a low, essentially linear characteristic.

The second elastomer body 30 has a height in the direction of the longitudinal axis L and a width transverse to the longitudinal axis L, the ratio of height to width being at least 1 to 3. As a result, the radial mount 46 has a low overall height, so that it is very stiff in the axial direction A and can transmit high loads, while in the radial direction R it is primarily loaded in shear and therefore has very low stiffness in the direction perpendicular to the longitudinal axis L.

Due to the described geometry of the first elastomer body 28 and the second elastomer body 30, the axial stiffness in the K0-position of the second elastomer body 30 is at least three times as high as the axial stiffness of the first elastomer body 28. At the same time, the radial stiffness in the X and/or Y-direction of the first elastomer body 28 is at least three times as high as that of the second elastomer body 30 in the corresponding directions.

Further embodiments of the elastic mount 10 are described below, using the same reference symbols for identical or functionally identical parts.

Figure 3:
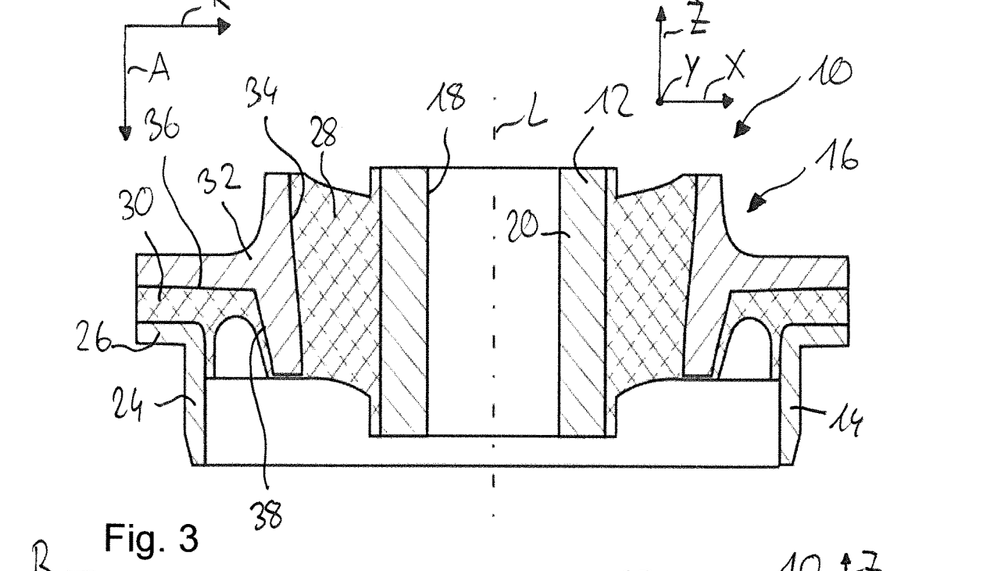
FIG. 3 a cross-section through an elastic mount under static preload according to a second embodiment.

FIG. 3 shows a second embodiment of the elastic mount 10, which differs from the first embodiment in the design of the inner part 12 and the intermediate element 32. The inner part 12 only has one axial section 20 and is therefore designed as a sleeve. The intermediate element 32 is approximately T-shaped in cross-section, wherein the surface of the intermediate element 32 facing the inner part 12 forms the first connection surface 34, which is inclined to the longitudinal axis L in the present embodiment.

In the second embodiment of mount 10 shown in FIG. 3, the axial mount 44 is disposed close to the inner part 12, and the radial mount 46 is disposed close to the outer part 14. Also in the second embodiment shown in FIG. 3, the first connection surface 34 of the intermediate element 32 extends essentially parallel to the longitudinal axis L, and the second connection surface 36 of the intermediate element 32, which is opposite the adhesive surface on the collar section 26 of the outer part 14, extends essentially perpendicular to the longitudinal direction L.

Figure 4:
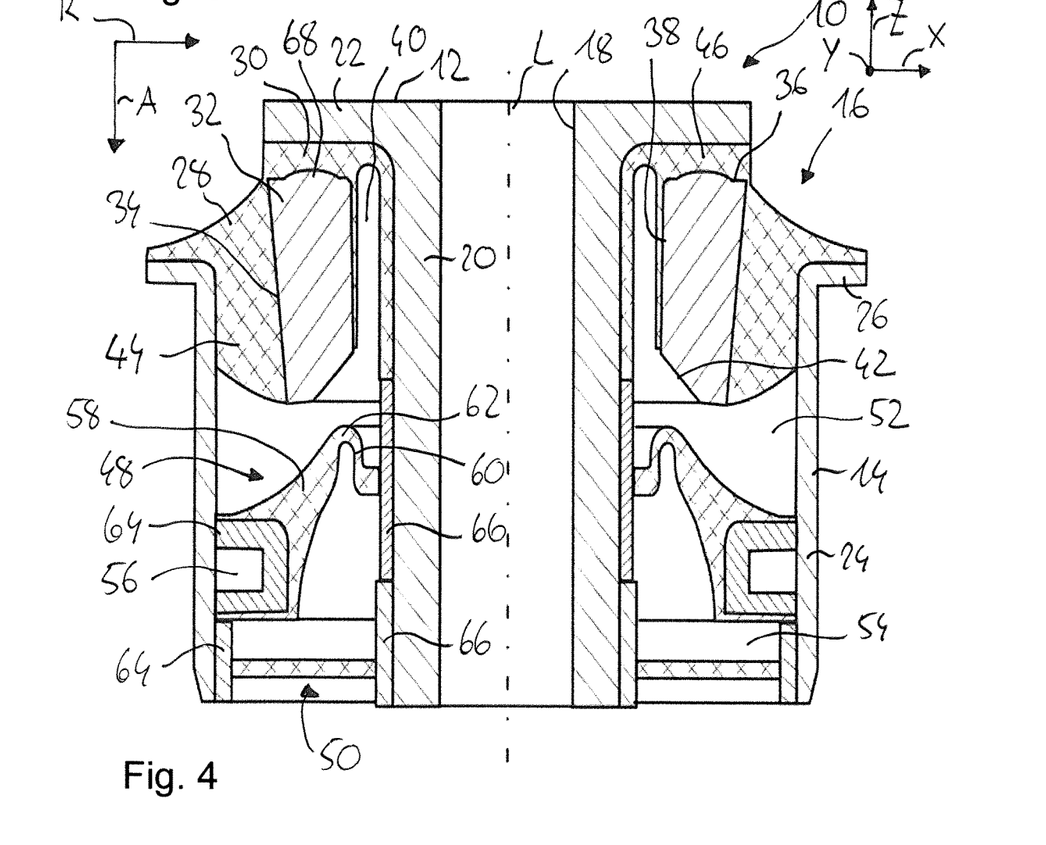
FIG. 4 a cross-section through an elastic mount under static preload according to a third embodiment.

In FIG. 4, a third embodiment of mount 10 is shown, which differs from the other two embodiments in that mount 10 is designed as a hydraulically damping mount, which can also be referred to as a hydromount. In addition to the elastomer mount 16, the mount 10 has a first diaphragm 48 and a second diaphragm 50, wherein the elastomer mount 16 and the first diaphragm 48 define a first fluid chamber 52 and the first diaphragm 48 and the second diaphragm 50 delimit a second fluid chamber 54. The two fluid chambers 52, 54 are filled with a fluid and connected to each other via a damping channel 56. The first fluid chamber 52 can also be referred to as the working chamber, and the second fluid chamber 54 as the compensation chamber.

The first diaphragm 48 has a first leg 58, a second leg 60 and a base 62 connecting the two legs 58, 60. As can be seen in FIG. 4, the radially outer first leg 58 has an average thickness which is at least twice as thick as that of the radially inner second leg 60. Since the first leg 58 is at least twice as thick as the second leg 60, the first diaphragm 48 can perform large movements in axial direction A and/or in radial direction R and is at the same time very expansion-stiff at differential pressures between the fluid chambers 52, 54. In particular, the base 62 can contact the inner part 12 when large movements in axial direction A and simultaneously a high differential pressure with high pressure in the first fluid chamber 52 and low pressure in the second fluid chamber 54 occur. As a result, the first diaphragm 58 has a high expansion stiffness, which results in improved damping.

For fastening the first diaphragm 58 to the inner part 12 and the outer part 14, an outer sleeve 64, into which the damping channel 56 is inserted, is bonded to the free end of the first leg 58, and an inner sleeve 66 is bonded to the free end of the second leg 60. The inner sleeve 66 is slid, in particular pressed, onto the inner part 12, and the outer sleeve 64 is inserted, in particular pressed, into the outer part 14.

The second diaphragm 50 is designed as a compensating diaphragm which, for fixing on the inner part 12 and the outer part 14, has an inner sleeve 66 and an outer sleeve 64, the inner sleeve 66 being slid, in particular pressed, onto the inner part 12 and the outer sleeve 64 being inserted, in particular pressed, into the outer part 14. As the outer sleeve 64 is made of a laser-absorbing plastic, it may be welded to the outer part 14 by means of laser transmission welding.

As can also be seen in FIG. 4, the elastomer mount 16 differs from the elastomer mount 16 shown in FIGS. 1 and 2 in that the first connection surface 34 is inclined to the longitudinal axis L and that the second connection surface 36 has an elevation 68. The first connection surface 34 can be inclined at an angle of maximum+−15° to the longitudinal axis L of the mount 10.

When fitting the mount 10 shown in FIG. 4, the two diaphragms 50, 52 are fitted pretensioned in such a way that in the K0 position they again largely assume the nonextended shape shown in FIG. 4. For this purpose, the elastomer mount 10, in particular the first elastomer body 28, must be able to support almost the entire preload.

Figure 5:
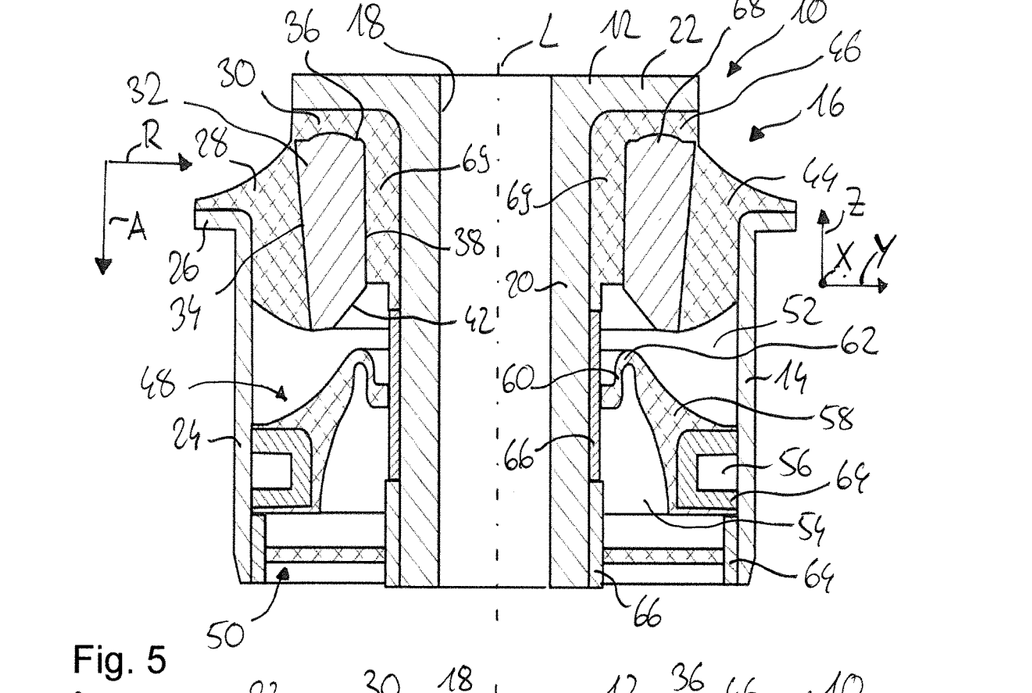
FIG. 5 a cross-section rotated by 90° compared to FIG. 4 through an elastic mount under static preload according to a fourth embodiment.

FIG. 5 shows a fourth embodiment of the mount, which differs from the embodiment shown in FIG. 4 in that the second elastomer body 30 is not rotationally symmetrical, but the second elastomer body 30 does not have a recess 40 in a sectional plane at 90° shown in FIG. 4. Thus the elastomer mount 16 is not rotationally symmetrical and essentially flat, but the second elastomer body 30 is continued in radial direction R into the vertical gap and forms an elastomer pad 69 which acts in the X-direction and/or the Y-direction. Thus the spread of the radial characteristics can be increased.

Figure 6:
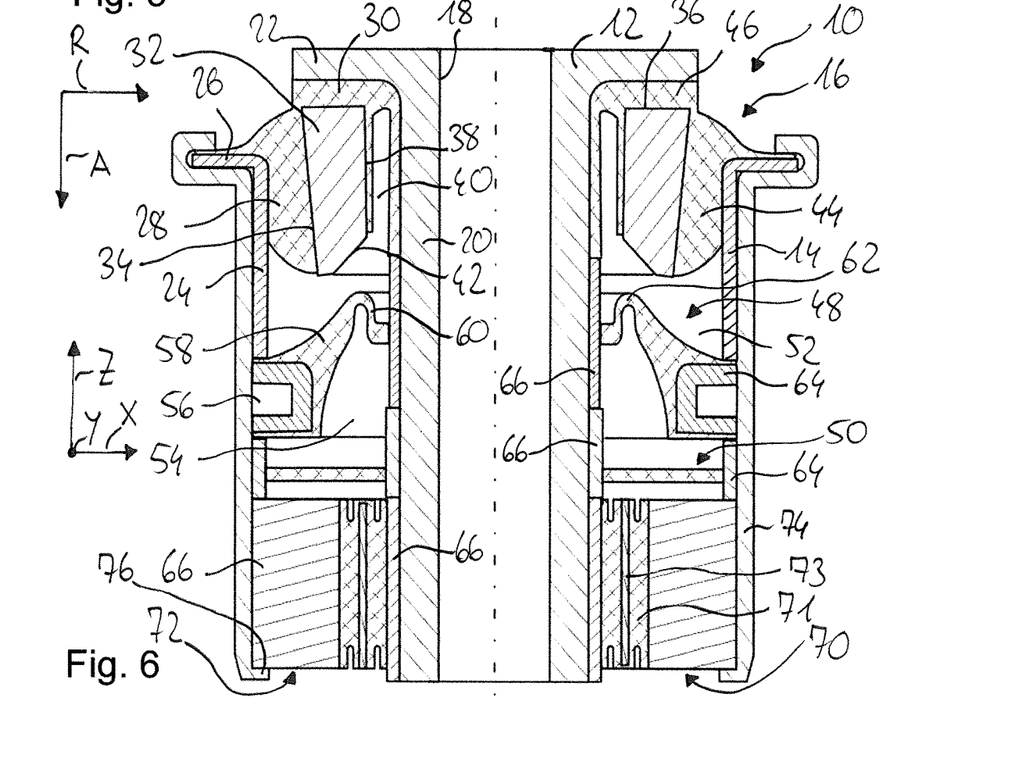
FIG. 6 a cross-section through an elastic mount under static preload according to a fifth embodiment.

In FIG. 6, a fifth embodiment of the mount 10 is shown, which differs from the third and fourth embodiments in that a second elastomer mount 70 is arranged at the end, which acts as a second radial mount 72.

The second radial mount 72 has an inner sleeve 66, an outer sleeve 64, an elastomer element 71 and intermediate plates 73 inserted in the elastomer element 71. The second radial mount 72 preferably has a high characteristic spread.

The advantage of this design is that the radial stiffnesses of the elastomer mount 16 and of the second radial mount 72 are connected in parallel. As a result, the radial stiffness of the axial mount 44 no longer determines the radial stiffness of the overall design.

As can be seen in FIG. 6, the elastomer mount 16, the first diaphragm 48, the second diaphragm 50 and the second elastomer mount 70 are inserted into a receiving cup 74. To fix the elastomer mount 16, the first diaphragm 48, the second diaphragm 50 and the second elastomer mount 70 within the receiving cup 74, the receiving cup 74 has a circumferential edge section 76 at the bottom. In addition, the receiving cup 74 is folded over around the collar section 26, especially beaded.

The design shown in FIG. 6 simplifies the vulcanisation or enables a robust vulcanisation tool design, as the sleeve section 24 can be made shorter than in the design mould of FIGS. 4 and 5 and therefore does not have to be immersed as deeply into the vulcanisation tool. It is also possible to use a deep-drawn receiving cup in which the bottom is punched out in order to produce the circumferential edge section 76 for fixing the parts inserted from above.

Figure 7:
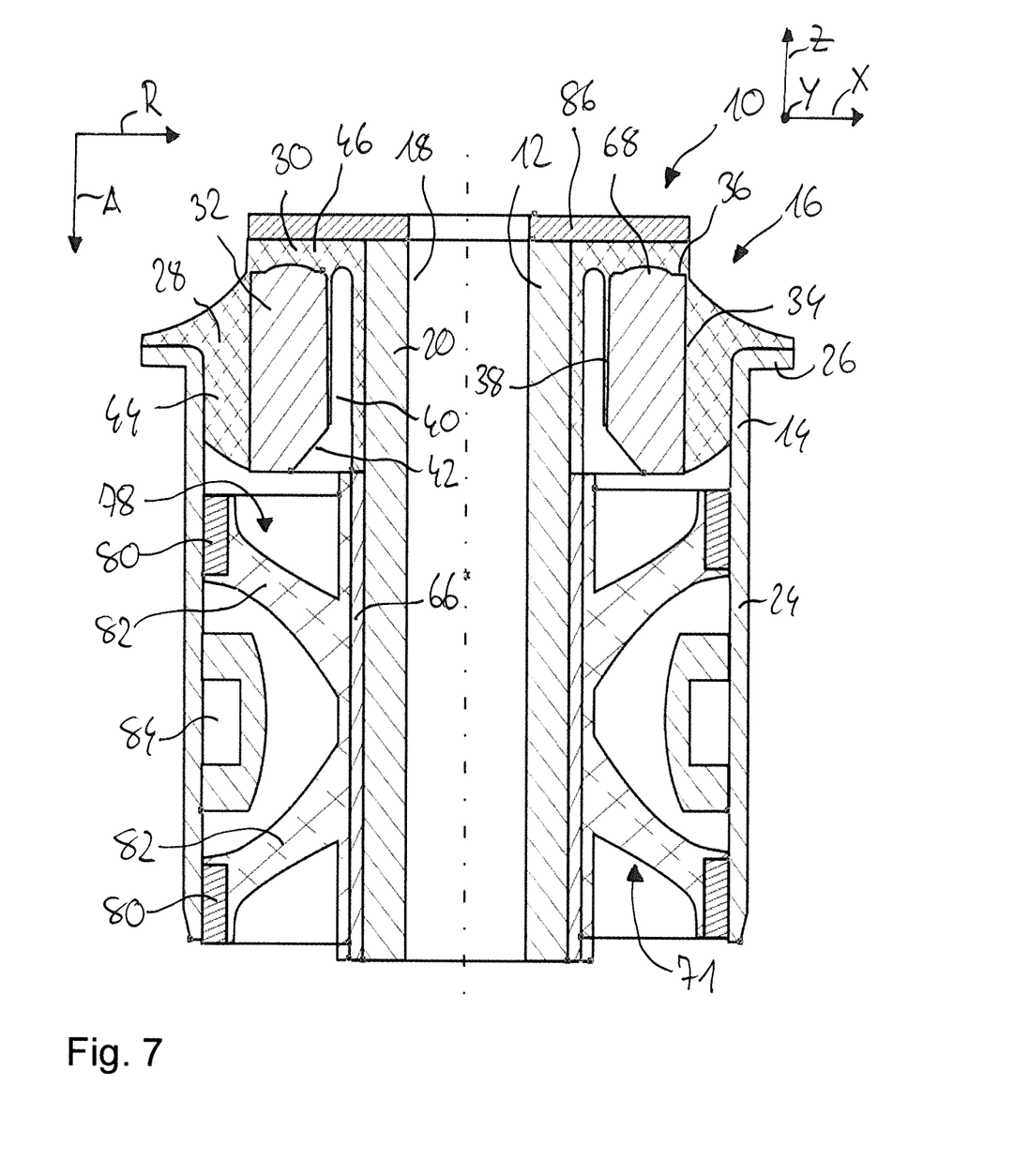
FIG. 7 a cross-section through an elastic mount under static preload according to a sixth embodiment.

FIG. 7 shows a sixth embodiment of the elastic mount 10, which differs from the other embodiments in that a radially damping hydromount 78 is integrated.

The hydromount 78 has an inner sleeve 66, by means of which the hydromount 78 can be slid, in particular pressed, onto the inner part 12, an elastomer element 71 and a cage-shaped fastening element 80 or two substantially annular fastening elements 80, by means of which the hydromount 78 can be inserted, in particular pressed, into the outer part 14.

The elastomer element 71 is bonded to the inner sleeve 66 and the two sleeve-shaped fastening elements 80, the elastomer element 71 having two elastomer diaphragms 82 which delimit the fluid chambers 52, 54, which are filled with a fluid. The fluid chambers 52, 54 are connected to each other via a channel 84, which here is a separate part and is inserted, in particular pressed into the outer part 14.

As can also be seen in FIG. 7, the radial section 22 is formed by a separate plate 86 which is attached positively and/or in a substance-to-substance connection to the inner part and/or is frictionally clamped between inner part 20 and the vehicle connection (not shown) after assembly. Radial mount 36 is then vulcanized to plate 86. In addition, the intermediate element 32 shown in FIG. 7 has an elevation 68.

The mount 10 is characterised by the intermediate element 32, which divides the elastomer mount 16 into two elastomer bodies 28, 30, namely, an axial mount 44 which is soft in shear in the Z-direction and a radial mount 46 which is soft in shear in the X-direction and/or in the Y-direction, enabling the elastic mount 10 to decouple the radial direction R from the axial direction A. In the K0 position, the axial mount 44 has a shear pad aligned in the axial direction A, which has a relatively little progressive characteristic curve independent of the spring deflection state. The radial mount 46 is radially very soft in shear and at the same time axially very stiff. As a result, the radial mount 46 can transmit the axial loads to the axial mount 44 without the strain on its elastomer being very high. By inserting the intermediate element 32, a radially soft mount arrangement can thus be combined with a shear-soft linear mount arrangement in axial direction A for high preloads. In addition, the radially soft axial mount assembly consisting of the first elastomer body 28, the second 30 elastomer body and the intermediate element 32 may also be used as a working diaphragm in a hydraulically damping mount, especially in an axially damping hydromount. In addition, the intermediate element 32 increases the expansion stiffness of the elastomer pad even under high axial deflection distances and thus enables a high pumping capacity.

Due to the design of the intermediate element 32 and the elastomer bodies 28, 30 arranged on both sides, a particularly modularly adjustable characteristic spread is possible, namely a soft characteristic in the Z-direction that is almost linear over a wide load range and can bear particularly high loads and thus deflections in the Z-direction, in combination with low radial stiffness in the Y- and X-direction. This is achieved in particular by the alignment or the gradient of the connection surfaces 34, 36 to the longitudinal axis L of the mount 10. By providing the connection surfaces 34, 36 on the intermediate element 32 extending to the longitudinal axis L of mount 10, two mounts can be connected in series, wherein the lowest stiffness of the in series-connected stiffness dominates the overall stiffness. In this way, very high axial stiffness can be combined with an axially soft mount of linear characteristics over a high load range to form a mount with particularly high durability and linear mount behaviour, while particularly soft radial stiffness combined with high radial stiffness results in low overall radial stiffness.

The elastic mount 10 can be used wherever high axial loads occur and, at the same time, a stiffness curve that is as linear as possible and low radial stiffness under load are required for high driving comfort. The elastic mount 10 may be used, for example, as a rear axle support mount or body mount, power-unit mount such as an engine mount or radiator mount, or as a cab mount in passenger cars or trucks.

The invention claimed is:

1. An elastic mount for absorbing static and dynamic loads of a vehicle part, comprising:
   an inner part configured for connection to said vehicle part,
   an outer part configured for insertion into a receiving eye or connected to a vehicle structure, and
   at least one elastomer mount which elastically connects the inner part and the outer part to one another,
   wherein the elastomer mount is transferable from a first position to a second position when absorbing a static load acting in a direction of a longitudinal axis of the mount; the elastomer mount has a first elastomer body, a second elastomer body, and an intermediate element which is arranged between the first elastomer body and the second elastomer body and to which the first and second elastomer bodies are connected in a substance-to-substance connection, the intermediate element having at least one first connection surface for the first elastomer body and at least one second connection surface for the second elastomer body, the first connection surface being aligned with the longitudinal axis of the elastomer mount such that for absorbing the loads, in the second position the first elastomer body is configured to have a low stiffness rate in shear in a Z-direction, and to have a high stiffness rate in an X-direction and/or in a Y-direction higher than the low stiffness rate in the Z-direction; and the second connection surface is oriented with the longitudinal axis of the elastomer mount such that for absorbing the loads, in the second position the second elastomer body is configured to have a low stiffness rate in shear in the X-direction and/or in the Y-direction, and to have a high stiffness rate in the Z-direction higher than the low stiffness rate in the X-direction and/or in the Y-direction; and the high stiffness rate of the first elastomer body in the X-direction and/or in the Y-direction is higher than the low stiffness rate of the second elastomer body in the X-direction and/or in the Y-direction, and the high stiffness rate of the second elastomer body in the Z-direction is higher than the low stiffness rate of the first elastomer body in the Z-direction.

2. The elastic mount of claim 1, wherein the first connection surface is oriented parallel to the longitudinal axis of the mount or at an angle deviating between 15° in the positive and negative angular directions to the longitudinal axis of the mount.

3. The elastic mount of claim 1, wherein the second connection surface is oriented perpendicular to the longitudinal axis of the mount or at an angle deviating between 10° in the positive and negative angular directions to an axis perpendicular to the longitudinal axis.

4. The elastic mount of claim 1, wherein the first connection surface and/or the second connection surface has at least one recess and/or at least one elevation.

5. The elastic mount of claim 1, wherein the second elastomer body has a height in the direction of the longitudinal axis and a width transverse to the longitudinal axis, a ratio of height to width being at least 1 to 3.

6. The elastic mount of claim 1, wherein the first elastomer body has a height in the direction of the longitudinal axis and a width transverse to the longitudinal axis, the height being greater than or equal to the width in the second position.

7. The elastic mount of claim 1, wherein the first elastomer body and/or the second elastomer body has at least one elastomer pad which acts in the X-direction and/or Y-direction.

8. The elastic mount of claim 1, wherein the intermediate element is annular.

9. The elastic mount of claim 1, wherein the intermediate element is rectangular, L-shaped or T-shaped in cross-section.

10. The elastic mount of claim 1, wherein a first diaphragm and a second diaphragm are provided; the elastomer mount and the first diaphragm delimit a first fluid chamber and the first diaphragm and the second diaphragm delimit a second fluid chamber; and the first and second fluid chambers are filled with a fluid and are connected to one another via a damping channel in a fluid-conducting manner.

11. The elastic mount of claim 10, wherein the first diaphragm comprises a first leg, a second leg, and a base connecting the two legs; and an average thickness of one of the legs is at least twice the thickness of the other leg.

12. The elastic mount of claim 10, wherein a second elastomer mount is provided which acts in the X-direction and/or Y-direction.

13. The elastic mount of claim 1, wherein a hydraulically damped mount is integrated.

* * * * *